Oct. 15, 1935.  F. BLACKNEY  2,017,304
SOWING DEVICE
Filed Nov. 19, 1934   3 Sheets-Sheet 3
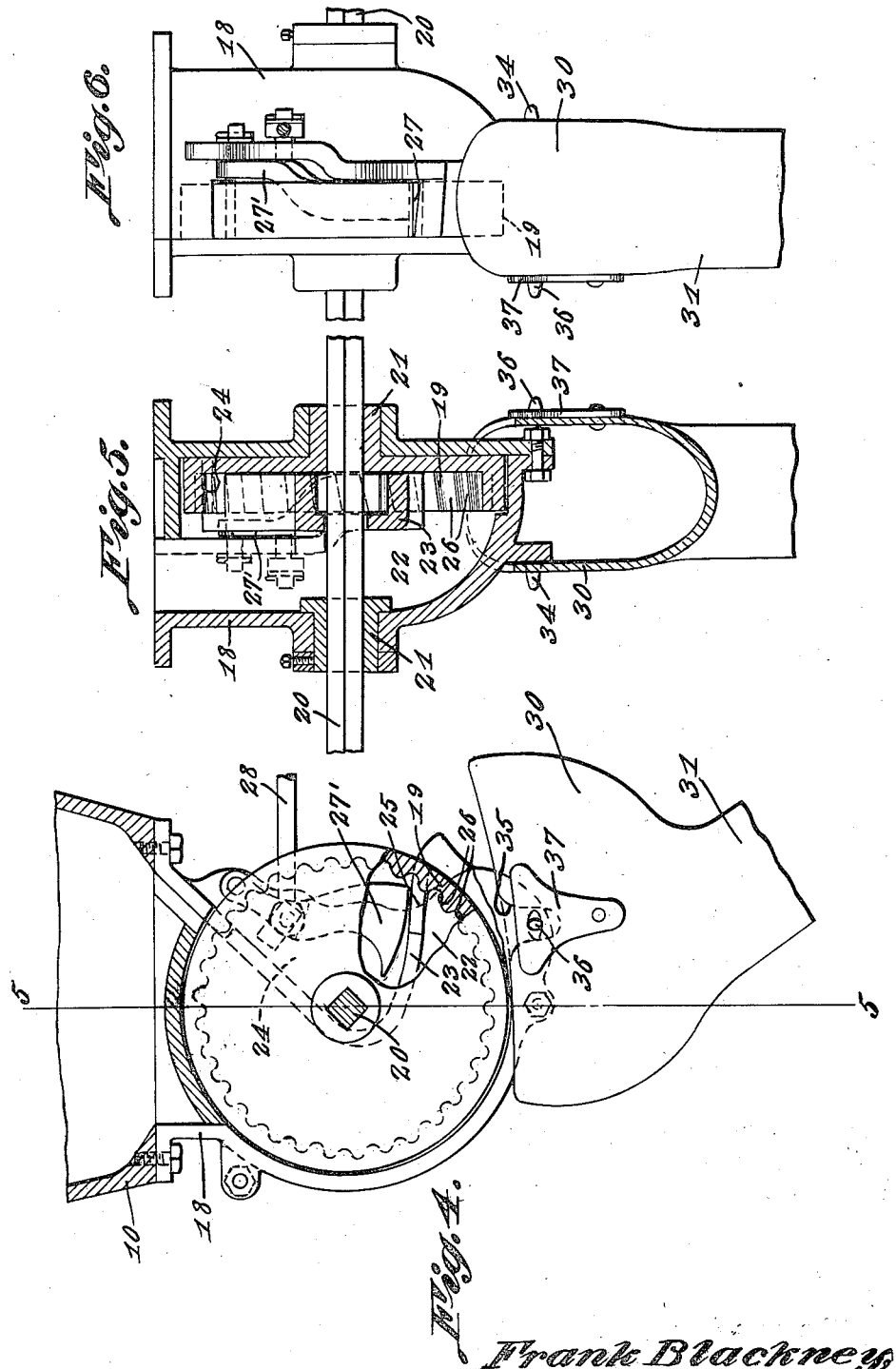

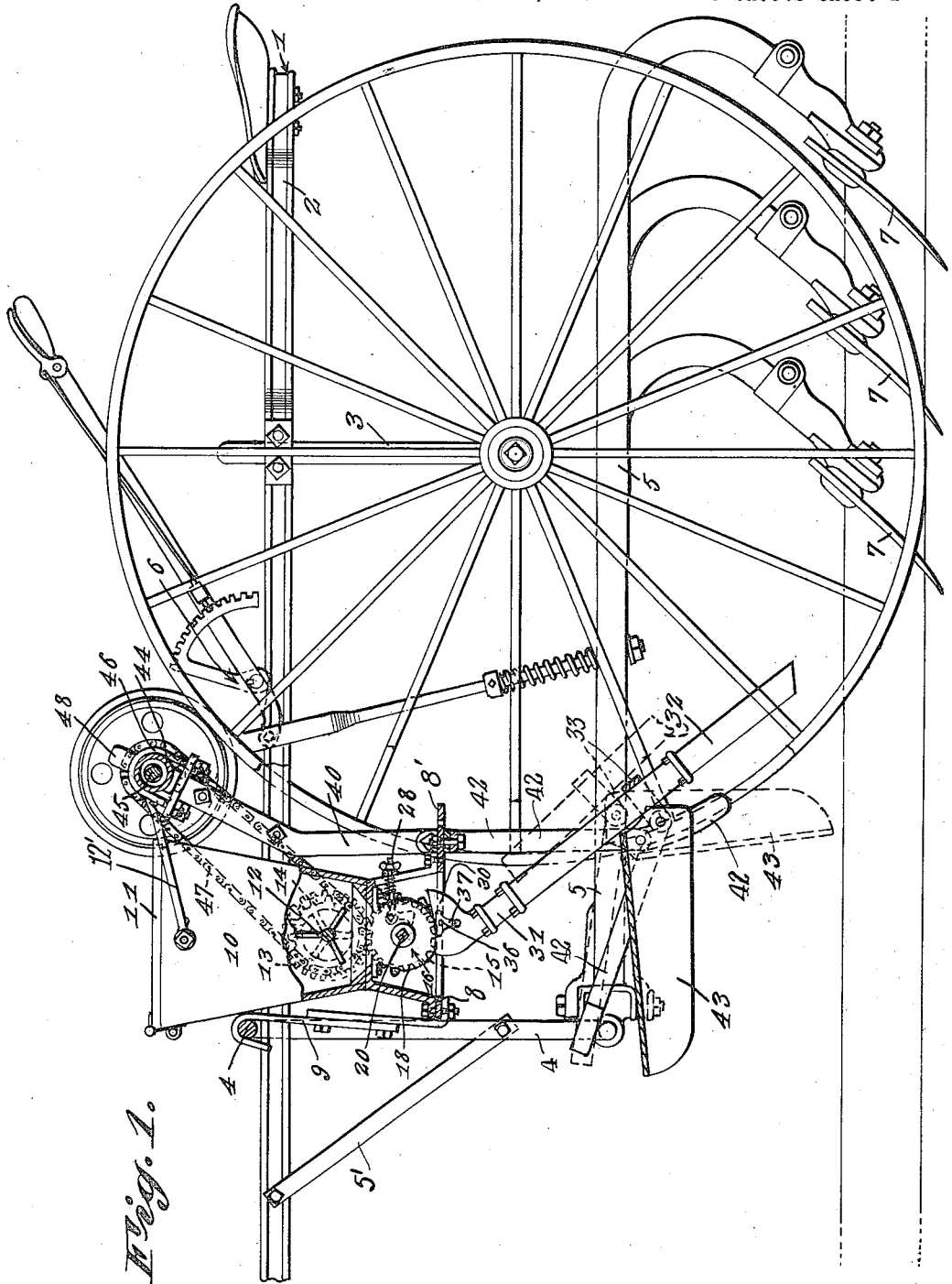

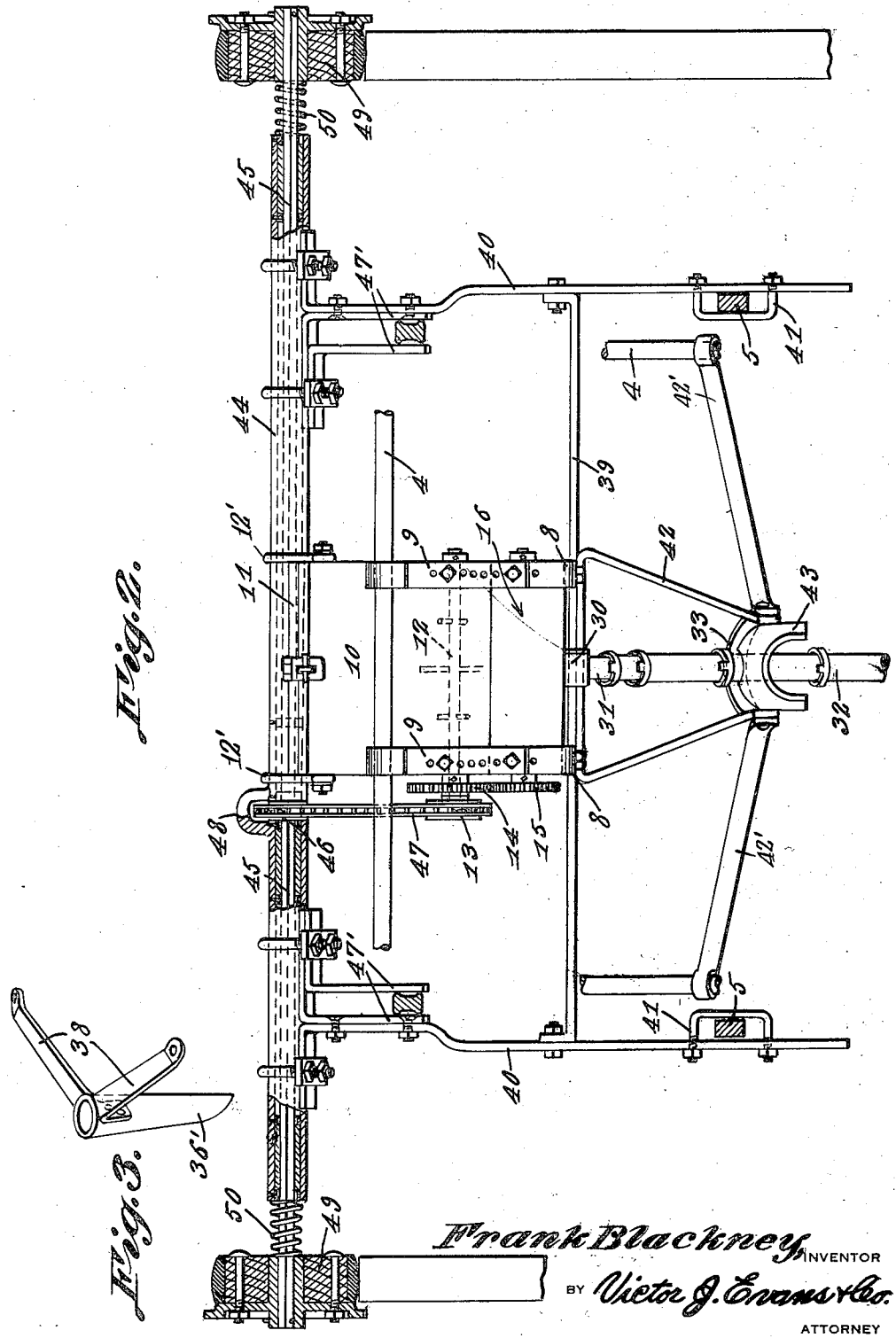

Patented Oct. 15, 1935

2,017,304

UNITED STATES PATENT OFFICE 2,017,304

SOWING DEVICE

Frank Blackney, Clear Lake, Wis.

Application November 19, 1934, Serial No. 753,747

3 Claims. (Cl. 111—67)

This invention relates to cultivator attachments and has for the primary object the provision of a device which is readily adaptable to a conventional type of straddle row cultivator so that the latter may be employed for seed planting or for sowing or distributing fertilizer and the like and is so constructed that its operation is governed by the positions occupied by the shovel beams of the cultivator thereby obviating the necessity of employing separable controls for the attachment and further the attachment construction is such that it will not interfere with the use of the cultivator.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a fragmentary vertical sectional view illustrating a cultivator with an attachment applied thereto and constructed in accordance with my invention.

Figure 2 is a horizontal sectional view showing the driving mechanism between the ground wheels of the cultivator and the attachment.

Figure 3 is a fragmentary perspective view showing a modified form of distributing spout.

Figure 4 is a fragmentary sectional view showing a distributor employed in the construction of the attachment.

Figure 5 is a fragmentary sectional view taken on the line 5—5 of Figure 4.

Figure 6 is a fragmentary end elevation, partly in section, of the distributor.

Referring in detail to the drawings, the numeral 1 indicates a conventional type of straddle row cultivator comprising a main frame 2 having secured thereto an arched axle 3 and an arched beam 4 to which the shovel beams 5 are connected and the latter are moved into operative and inoperative position by a suitable control 6. The beams 5 carry the usual ground engaging elements or shovels 7 and the arch beam 4 has braces 5' connected thereto.

To adapt a device of the character described for planting seeds or for distributing fertilizer or the like my invention is applied thereto and consists of a hanger 8 to which are secured suspending elements 9 in the form of hooks adapted to fit over the arched beam 4. The hanger 8 supports a hopper 10 provided with a removable cover 11 and has journaled therein an agitator 12 to which is secured a sprocket gear 13 and a gear 14. The gear 14 meshes with a gear 15 of a distributor 16 and the latter includes a housing 18 of sectional formation and in which is located a distributing disc or wheel 19 secured to a shaft 20 journaled in suitable bearings 21 carried by the housing. The shaft 20 is secured to the gear 15 and thereby driven by the agitator. A chamber 22 is formed in the housing 18 and receives the seeds or fertilizer from the hopper 10. Also formed in the housing 18 by a partition 23 is a chamber 24. The partition 23 has a slot 25 communicating the chamber 24 with the chamber 22 and through which operates the distributing wheel 19 and the latter is of the flanged type provided with a series of spaced pockets 26 formed by relatively spaced ribs on the flanged portion of the wheel. The ribs are disposed angularly so that the pockets are correspondingly shaped whereby during the rotation of the wheel seeds or fertilizer in the chamber 22 will be lifted into the chamber 24 and deposited therein in predetermined amounts. An outlet 27 is provided for the chamber 24. An adjustable gate 27' operates in the chamber 24 and in conjunction with the slot 25 for regulating the passing of the seeds or fertilizer from the chamber 22 to the chamber 24. A suitable means 28 is provided for adjusting the position of the gate with respect to the slot.

A cup 30 is removably secured to the housing 18 under the outlet 27 to receive the seeds or fertilizer from the chamber 24. The cup 30 has a neck 31 to which is detachably secured a spout 32 supported by a suitable bracket 33 on the hanger 8 and terminates in close proximity to the ground in advance of the shovels 7 of the cultivator. The spout 32 is preferably constructed of sections and may be adjusted as to length by the removal and replacement of certain sections. The cup 30 at one side is provided with an opening to receive a pin 34 on the housing 18 and the opposite side is provided with a notch 35 to receive a pin 36 on the housing 18. The pin 36 is engaged by a pivotal resilient catch 37 on the cup. The catch 37 and the arrangement of the pins permits the cup to be applied and removed from the housing 18 when desired. In lieu of the cup 30 and spout 32, a comparatively short spout 36' may be employed and is removably supported adjacent the outlet 27 by arms 38 detachably mounted to the housing. The spout 36' primarily is employed for distributing insect or bug powders on the foliage of growing plants.

The hanger 8 includes a platform 8' to which the hook-shaped elements 9 are secured and also secured thereto is a transversely arranged bar 39 to which is secured bars 40 that extend above and below the platform 8'. The lower portions of the bars 40 are equipped wtih U-clamps 41 which receive certain of the cultivator shovel beams 5 and permit said beams to have a limited movement relative thereto. A frame 42 is carried by the bar 39 and has connected therewith the bracket 33 and also braces 42' which connect to the arch beam 4. A shoe 43 is pivoted to the frame 42 and may occupy either of the positions as shown in Figure 1 and when arranged in a depending position, is located in advance of the spout to act as a guard thereto. The bracket 33 is arranged to extend in rear of and in contact with the spout to aid in supporting the latter.

The upper portions of the bars 40 have detachably secured thereto a housing 44 in which is rotatably and slidably supported a shaft 45 equipped with angularly related faces and to which a sprocket gear 46 is secured. Braces 12' are provided between the housing 44 and the hopper 11. The sprocket gear 46 is connected to the sprocket gear 13 by a sprocket chain 47. The sprocket gear 46 operates in an offset 48 formed in the housing 44. Guide brackets 47' cooperate with the bars 40 in straddling the frame of the cultivator and permit the entire attachment to pivot on the beam 4 of the cultivator for engaging and disengaging wheels 49 secured to the shaft 45 with the ground wheels of the cultivator. The wheels 49 are of the flanged type and provided with cushion treads. The lower ends of the bars 40 being connected to the cultivator beams 5 by the U-clamps 41 will bring about an engagement and disengagement of the wheels 49 wtih the ground wheels of the cultivator by the positioning of the cultivator beams 5 into operative and inoperative positions through the manipulation of the control 6.

A cultivator of the character described is so constructed that the beams 5 may be shifted transversely between the ground wheels and in order that the attachment may follow the adjustment mentioned the housing 44 is capable of sliding endwise of the shaft 45 so that the wheels 49 remain in alignment with the ground wheels of the cultivator. Cushion springs 50 are mounted on the shaft 45 between the ends of the housing and the wheels 49. The sprocket gear 46 is fixed for rotation wtih the shaft 45 but is capable of sliding relative to said shaft.

Having described the invention, I claim:

1. In combination with a straddle row cultivator having ground wheels and adjustably mounted shovel beams, a hanger removably and hingedly connected to the cultivator, a distributor carried by said hanger, a hopper for said distributor, an agitator for the hopper, a driving means between the agitator and the distributor, a discharge means for the distributor, a driving means for the agitator carried by said hanger and adapted to be engaged and disengaged with the ground wheels, and means for connecting the hanger to the shovel beams to engage and disengage the last-named drive means from the ground wheels by the adjustment of the shovel beams.

2. In combination with a straddle row cultivator having ground wheels and adjustably mounted shovel beams, a hanger hinged to the cultivator, an adjustable distributor carried by said hanger, a removable discharge spout for said distributor, a hopper for said distributor, an agitator for the hopper, a drive between the agitator and distributor, means for connecting the hanger to the shovel beams and capable of permitting the latter to have a limited movement relative to said hanger before bringing about a pivotal movement of said hanger, and a drive means between the agitator and the ground wheels and engaging and disengaging with the latter by the adjustment of the shovel beams.

3. In combination with a straddle row cultivator having ground wheels and adjustably mounted shovel beams, a hanger hinged to the cultivator, an adjustable distributor carried by said hanger, a removable discharge spout for said distributor, a hopper for said distributor, an agitator for the hopper, a drive between the agitator and distributor, means for connecting the hanger to the shovel beams and capable of permitting the latter to have a limited movement relative to said hanger before bringing about a pivotal movement of said hanger, a shaft housing carried by the hanger, a shaft rotatably and slidably mounted in said housing, drive means between the agitator and shaft, and flanged wheels secured to said shaft to be engaged and disengaged with the ground wheels by the pivotal movement of the hanger brought about by the adjustment of the shovel beams.

FRANK BLACKNEY.